US006972908B2

(12) United States Patent  (10) Patent No.: US 6,972,908 B2
Noda  (45) Date of Patent: Dec. 6, 2005

(54) THREE-GROUP ZOOM LENS INCLUDING CEMENTED LENS COMPONENT

(75) Inventor: Takayuki Noda, Saitama (JP)

(73) Assignee: Fujinon Corporation, Saitama (JP)

( * ) Notice: Subject to any disclaimer, the term of this patent is extended or adjusted under 35 U.S.C. 154(b) by 17 days.

(21) Appl. No.: 11/045,341

(22) Filed: Jan. 31, 2005

(65) Prior Publication Data

US 2005/0213223 A1    Sep. 29, 2005

(30) Foreign Application Priority Data

Mar. 23, 2004 (JP) .............................. 2004-084260

(51) Int. Cl.$^7$ ............................................. G02B 15/14
(52) U.S. Cl. ..................... 359/680; 359/682; 359/683; 359/689; 359/716; 359/753; 359/784; 359/761
(58) Field of Search ............................... 359/676, 680, 359/682–683, 689, 716, 753, 784, 761

(56) References Cited

U.S. PATENT DOCUMENTS

| 6,351,337 B1 * | 2/2002 | Tanaka ........................ 359/684 |
| 6,611,386 B2 * | 8/2003 | Tanaka ........................ 359/689 |
| 6,654,180 B2 * | 11/2003 | Ori ............................. 359/689 |
| 6,757,111 B2 * | 6/2004 | Takeuchi et al. ............ 359/784 |
| 6,809,879 B2 * | 10/2004 | Mihara ........................ 359/682 |
| 6,839,184 B1 * | 1/2005 | Shan ........................... 359/689 |
| 6,856,467 B2 * | 2/2005 | Iyama ......................... 359/682 |
| 2003/0099043 A1 * | 5/2003 | Takeuchi et al. ............ 359/682 |
| 2003/0117716 A1 * | 6/2003 | Sekita ......................... 359/680 |
| 2003/0165018 A1 * | 9/2003 | Mihara ........................ 359/680 |
| 2003/0169508 A1 * | 9/2003 | Ori ............................. 359/680 |
| 2003/0169509 A1 * | 9/2003 | Iyama ......................... 359/680 |
| 2003/0179465 A1 | 9/2003 | Noda |
| 2003/0189761 A1 * | 10/2003 | Park ............................ 359/680 |
| 2003/0197949 A1 * | 10/2003 | Eguchi ........................ 359/680 |
| 2004/0004772 A1 * | 1/2004 | Ohashi et al. .............. 359/689 |
| 2005/0013014 A1 * | 1/2005 | Mizuguchi et al. ......... 359/680 |

* cited by examiner

*Primary Examiner*—Evelyn A. Lester
(74) *Attorney, Agent, or Firm*—Arnold International; Jon W. Henry; Bruce Y. Arnold (57) ABSTRACT

A zoom lens includes three lens groups. The first lens group from the object side has negative refractive power and is formed of a lens component having negative refractive power and a lens element having positive refractive power. The second lens group from the object side has positive refractive power and is formed of two lens components, an object-side lens component that is a glass lens element with a convex surface on the optical axis on the object side and having an aspheric surface and an image-side lens component that includes a cemented surface and an image-side concave surface. The third lens group consists of a biconvex lens component. Only the first and second lens groups move along the optical axis for zooming. The zoom lens may be formed of only six lens elements, includes at least one aspheric surface, and satisfies specified conditions for compactness and aberration correction.

20 Claims, 4 Drawing Sheets

Spherical Aberration
Fig. 3A

Astigmatism
Fig. 3B

Distortion
Fig. 3C

Spherical Aberration
Fig. 4A

Astigmatism
Fig. 4B

Distortion
Fig. 4C

Spherical Aberration
Fig. 5A

Astigmatism
Fig. 5B

Distortion
Fig. 5C

Spherical Aberration
Fig. 6A

Astigmatism
Fig. 6B

Distortion
Fig. 6C

Spherical Aberration
Fig. 7A

Astigmatism
Fig. 7B

Distortion
Fig. 7C

Spherical Aberration
Fig. 8A

Astigmatism
Fig. 8B

Distortion
Fig. 8C

THREE-GROUP ZOOM LENS INCLUDING CEMENTED LENS COMPONENT

FIELD OF THE INVENTION

The present invention relates to a zoom lens with a cemented lens component that is suitable for incorporating into small information terminal equipment, such as cellular telephones with cameras and PDAs (Personal Digital Assistants).

BACKGROUND OF THE INVENTION

In recent years, digital still cameras (hereinafter referred to simply as digital cameras) that are capable of inputting image information such as photographed scenery and portraits into a personal computer have rapidly become popular along with the popularity of personal computers in homes. Associated with advanced functions in cellular telephones, cellular telephones equipped with a camera that includes a small imaging module have also become popular. Even in small information terminal equipment, such as PDAs, including an imaging module has become popular.

In devices with an imaging function, image pickup elements, such as CCD (Charge Coupled Device) and CMOS (Complementary Metal Oxide Semiconductors) elements, have been used in the image pickup modules. For these image pickup elements, great progress has been made in both miniaturizing the elements and in increasing the number of image pixels, in association with the requirement of compactness of the body of the imaging device and lenses mounted in the imaging device and the requirement of high resolution performance. For example, even in a cellular telephone with a camera, megapixel (one million or more pixels) imaging has been practically used, creating a demand for higher performance in these devices.

In an imaging device using an image pickup element, an optical zoom mode and an electronic zoom mode are available for realizing the zoom function. In the optical zoom mode, the image size is varied optically by using a zoom lens as the imaging lens. In contrast, in the electronic zoom mode, the size of an image is electronically changed by electronic processing of electrical signals produced from an image. In general, the optical zoom mode can provide higher resolving properties than the electronic zoom mode. Therefore, when zooming needs to be performed with high resolution, the optical zoom mode is preferable.

Conventionally, small zoom lenses are known for use in digital cameras. For example, Japanese Laid-Open Patent Application 2003-270533 discloses zoom lenses that are smaller than previous zoom lenses used in digital cameras. The zoom lenses disclosed in this publication include five or six lens elements included in two lens groups.

In small information terminal devices, such as cellular telephones equipped with cameras, fixed focus lenses have been used based on requirements of miniaturization and low cost. However, associated with advanced functions and multiple functionality, there is a demand for a zooming function. Therefore, in recent years, even with cellular telephones equipped with a camera using a fixed-focus lens, the zoom function has been realized recently by adopting an electronic zoom mode. However, with this electronic zoom mode, the greater the magnification of an image, the more the resolution deteriorates, making it difficult to make full use of the large number of image pixels now available in image pickup elements.

Even in cellular telephones equipped with cameras, adopting an optical zooming method by mounting a zoom lens is desirable. In this case, it is not realistic to use a zoom lens having the high performance that has been developed for digital cameras without making modifications based on considerations of cost and compactness. In the zoom lenses disclosed in the above mentioned Japanese Laid-Open Patent Application 2003-270533, although miniaturization with a comparatively small number of lens elements has been accomplished for zoom lenses for digital cameras, additional miniaturization and lower cost are preferable. Although the prior art also describes a low-cost, compact zoom lens constructed with about three lens elements that has been developed, this lens is not designed for operation with image pickup elements currently available that have a very large number of image pixels.

BRIEF SUMMARY OF THE INVENTION

The present invention relates to a low cost, compact zoom lens with a cemented lens component that is particularly suitable for incorporating into small information terminal equipment that operate with a large number of image pixels.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
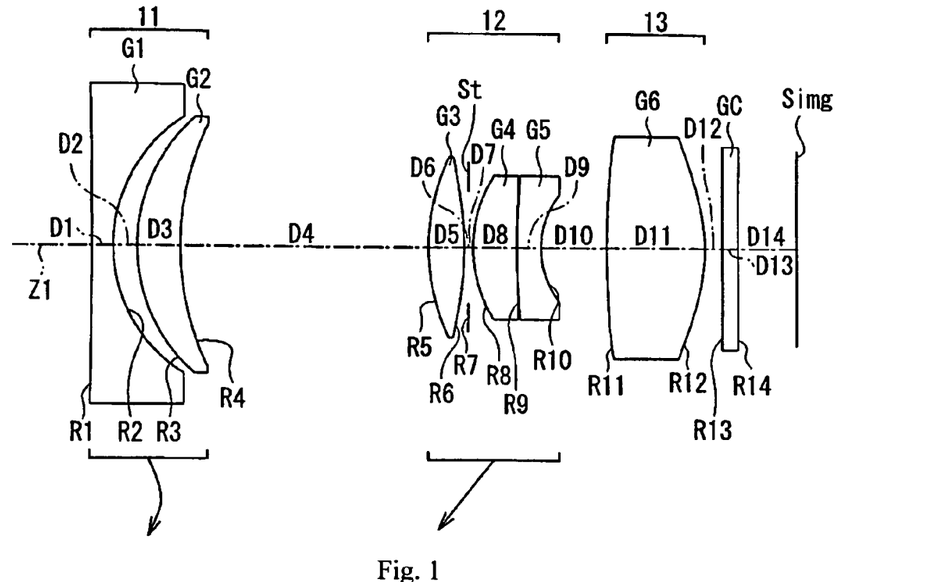
FIG. 1 shows a cross-sectional view of Embodiment 1 of the zoom lens of the present invention at the wide-angle end.

A general description of the three-group zoom lens of the present invention that pertains to the three disclosed embodiments of the invention will first be described with reference to FIG. 1 that shows Embodiment 1. The object side of the zoom lens is on the left as shown in FIG. 1 and the image side of the zoom lens is on the right side as shown in FIG. 1. In FIG. 1, lens elements are referenced by the letter G followed by a number denoting their order from the object side of the zoom lens along the optical axis Z1, from G1 to G6. Also shown in FIG. 1 is an aperture stop St and a cover glass GC. The radii of curvature of the optical surfaces are referenced by the letter R followed by a number denoting their order from the object side of the zoom lens, from R1 to R14. The on-axis surface spacings along the optical axis Z1 of the optical surfaces are referenced by the letter D followed by a number denoting their order from the object side of the zoom lens, from D1 to D14. In the same manner, the three lens groups are labeled 11, 12, and 13 in order from the object side of the zoom lens and the optical components belonging to each lens group are indicated by brackets adjacent the labels 11, 12, and 13.

The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing together two lens elements. The term "lens group" is herein defined as an assembly of one or more lens components in optical series and with no intervening lens components along an optical axis that during zooming is movable as a single unit relative to another lens component or other lens components.

The zoom lens of the present invention is particularly suitable for use in small image pickup equipment using image pickup elements, for example, small information terminal equipment such as cellular telephones with cameras. This zoom lens includes, arranged along the optical axis Z1 in order from the object side, a first lens group 11 having negative refractive power, a second lens group 12 having positive refractive power, and a third lens group 13 having positive refractive power. An aperture stop St is located within the second lens group 12, for example as shown in FIG. 1, between the object-side lens component, which is a lens element G3, and the image-side lens component, which, as shown in FIG. 1, includes lens elements G4 and G5, of the second lens group 12. That is, with regard to the stop St, as shown in FIG. 1, which shows Embodiment 1, the stop St that acts as an aperture stop and moves as a unit with the second lens group 12 is positioned on the image side of the object-side lens element G3 of the second lens group 12. However, in Embodiments 2 and 3 of the present invention, the stop St is positioned on the object side of the object-side lens element G3 of the second lens group 12.

An image pickup element (not shown in the drawings), such as a CCD, is arranged at an imaging surface (image pickup surface) Simg. Various optical members may be arranged between the third lens group 13, which is the image-side lens group, and the image pickup surface Simg in accordance with the particular camera construction and the desired camera operation. As shown in FIG. 1, a cover glass GC for protecting the image pickup surface Simg is arranged on the object side of the image pickup surface Simg. Other optical members, such as an infrared cut-off and/or a low-pass filter, may also be arranged on the image side of the third lens group 13.

This zoom lens adopts a two-group zooming system. In particular, zooming is performed by moving only the first lens group 11 and the second lens group 12 along the optical axis Z1. That is, the third lens group does not move along the optical axis Z1 during zooming. As shown in FIG. 1, downwardly directed arrows indicate generally the locus of points of the direction of movement along the optical axis Z1 of the first lens group 11 and the second lens group 12 during zooming from the wide-angle end to the telephoto end of the zoom range. Focus adjustment may be performed by movement of the third lens group 13. However, it is preferable not to move the third lens group 13 for either focus adjustment or zooming so as to reduce the number of moving groups and thereby simplify the operation. Fewer movable parts are preferable in cellular telephones with cameras because this enhances mechanical strength and durability. To this end, focus adjustment may be performed by moving only the first lens group 11 or by moving both the first lens group 11 and the second lens group 12, for example, toward the object side as shown in FIG. 1 in order to achieve short-distance photography. The downwardly directed arrows of FIG. 1 are intended to illustrate such focusing adjustment generally as well as movement along the optical axis Z1 associated with zooming.

The first lens group 11 includes a lens component that is a first lens element G1 and a lens component that is a second lens element G2. The first lens element G1 has negative refractive power and has a biconcave shape. The first lens element G1 may, for example, have aspheric surfaces on both sides and be made of plastic. The second lens element G2 has positive refractive power, a meniscus shape, and spherical surfaces on both sides. The second lens element G2 has its convex surface on the object side.

The second lens group 12 includes a third lens component that is a lens element G3 and a fourth lens component that is formed of a fourth lens element G4 and a fifth lens element G5. The fourth lens element G4 and the fifth lens element G5 are cemented together. The third lens element G3 has positive refractive power and is an aspheric lens with a convex surface at least on the optical axis at least on the object side. In Embodiment 1, as shown in FIG. 1, the third lens element G3 is biconvex both on the optical axis and on its periphery. In contrast, in Embodiment 2, shown in FIG. 2, the third lens element G3 is biconvex on the optical axis but changes to a concave surface on the image side toward the periphery. Additionally, both surfaces of the third lens element G3 may be aspheric surfaces, and, in fact, that is true of all of Embodiments 1–3 that will be described below. The fourth lens element G4 is cemented to the fifth lens element G5 to form an image-side lens component of the second lens group 12. The fifth lens element G5 has a concave surface on the image side.

Figure 2:
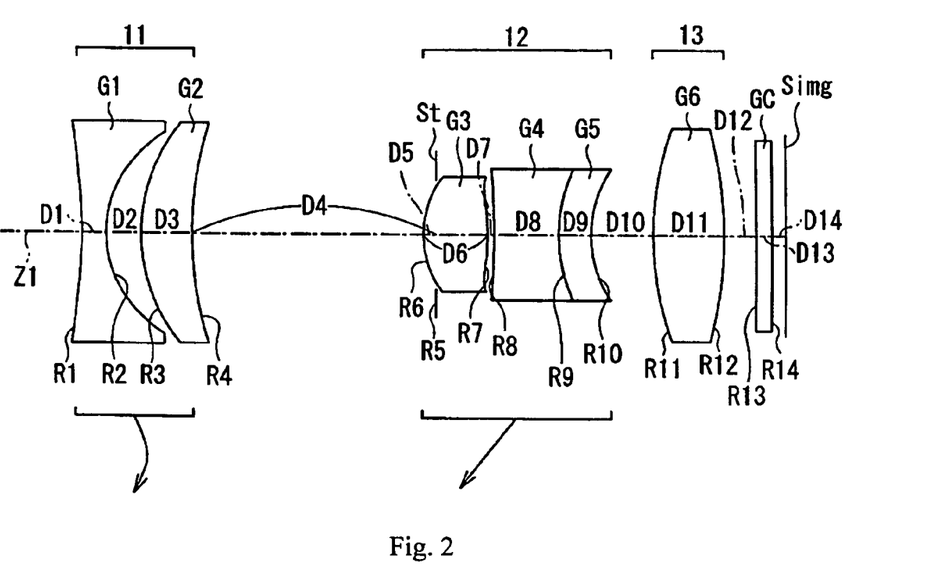
FIG. 2 shows a cross-sectional view of Embodiment 2 of the zoom lens of the present invention at the wide-angle end.

Additionally, as shown in FIG. 1, in Embodiment 1 that will be described below, the fourth lens element G4 has positive refractive power and a meniscus shape with its concave surface on the image side while, as shown in FIG. 2, in Embodiment 2 that will be described below, the fourth lens element G4 is biconcave, thus having negative refractive power.

The third lens group 13 is formed of a single lens component that is a single lens element G6. The sixth lens element G6 is biconvex, thus having positive refractive power, and preferably has at least one aspheric surface and is made of plastic.

The zoom lens of the present invention satisfies the following Conditions (1) and (2):

$$4.0 < Tt/fw < 5.0 \qquad \text{Condition (1)}$$

$$1.1 < f2g/fw < 1.45 \qquad \text{Condition (2)}$$

where
- Tt is the distance from the most object-side lens surface of the zoom lens to the image plane at the telephoto end when the zoom lens is focused on an object at infinity,
- fw is the focal length of the zoom lens at the wide-angle end when the zoom lens is focused on an object at infinity, and
- f2g is the focal length of the second lens group 12.

Additionally, the zoom lens of the present invention preferably satisfies the following Conditions (3) and (4):

$$30 < |v3/f3 + v4/f4 + v5/f5| fw < 50 \qquad \text{Condition (3)}$$

$$0.4 < DG45/fw < 0.9 \qquad \text{Condition (4)}$$

where
- v3 is the Abbe number at the d-line (587.6 nm) of the third lens element G3,
- f3 is the focal length of the third lens element G3,
- v4 is the Abbe number at the d-line (587.6 nm) of the fourth lens element G4,
- f4 is the focal length of the fourth lens element G4,
- v5 is the Abbe number at the d-line (587.6 nm) of the fifth lens element G5,
- f5 is the focal length of the fifth lens element G5,
- DG45 is the on-axis thickness of the fourth lens component that includes the fourth lens element G4 and the fifth lens element G5, and
- fw is as defined above.

Additionally, preferably the zoom lens satisfies the following Condition (5):

$$65 < |v3/f3 + v4/f4 + v5/f5 + v6/f6| \cdot fw < 75 \qquad \text{Condition (5)}$$

where
- v3, f3, v4, f4, v5, and f5 are as defined above,
- v6 is the Abbe number at the d-line (587.6 μm) of the sixth lens element G6, and
- f6 is the focal length of the sixth lens element G6.

Condition (1) relates to the overall length of the lens system. If the lower limit of Condition (1) is not satisfied, the overall length becomes too short, making it difficult to maintain good performance, especially at the telephoto end of the zoom range. If the upper limit of Condition (1) is not satisfied, although good performance can be achieved, the overall length becomes too long, and the ability to compete in the market is effectively lost.

Condition (2) relates to the zooming power of the second lens group 12, which is the image-side lens group of the two lens groups that move for zooming. Satisfying Condition (2) comparatively strengthens the power of the second lens group 12 because it makes it easier to shorten the overall length of the lens system.

Condition (3) relates to achieving achromatism within the second lens group 12. By selecting appropriate glass materials for the lens elements so that Condition (3) is satisfied, excellent achromatic correction is achieved within the second lens group 12.

Condition (4) provides for an appropriate range of on-axis thickness of the fourth lens component that includes lens elements G4 and G5 that are cemented together. Satisfying Condition (4) enables minimizing fluctuations of the image plane when zooming, and in particular, enables excellent maintenance of the image plane position in the intermediate range of zooming. It is also advantageous in minimizing axial chromatic aberration. If the lower limit of Condition (4) is not satisfied, the on-axis thickness becomes too thin, causing the front principal point position of the entire second lens group 12, including the cemented lens component, to shift, and in particular, the space between the first lens group 11 and the second lens group 12 becomes undesirably small when focusing at a large distance.

Condition (5) relates to the Abbe numbers of the lens elements within the second lens group 12 and the third lens group 13. By selecting appropriate glass materials for these lens elements so that Condition (5) is satisfied, excellent performance related to correction of chromatic aberration may be achieved.

In the zoom lens of the present invention, the lens surfaces that are aspheric are defined using the following equation:

$$Z = [(C \cdot Y^2)/\{1 + (1 - K \cdot C^2 \cdot Y^2)^{1/2}\}] + \Sigma(A_i \cdot Y^i) \qquad \text{Equation (A)}$$

where
- Z is the length (in mm) of a line drawn from a point on the aspheric lens surface at a distance Y from the optical axis to the tangential plane of the aspheric surface vertex,
- C is the curvature (=1/the radius of curvature, R in mm) of the aspheric lens surface on the optical axis,
- Y is the distance (in mm) from the optical axis,
- K is the eccentricity, and
- $A_i$ is the ith aspheric coefficient, and the summation extends over i.

In Embodiment 1 of the present invention that will be described below, aspheric coefficients other than those listed are zero, and both surfaces of the third lens element G3 and the sixth lens element G6 are aspheric. In Embodiments 2 and 3 of the present invention that will be described below, aspheric coefficients other than those listed are zero, and both surfaces of the first lens element G1 and the third lens element G3 are aspheric.

This zoom lens is constructed with six lens elements in five lens components and in three lens groups. Increasing the number of lens elements and lens components enables brighter imaging and better correction of aberrations in comparison with zoom lenses constructed with only five lens elements generally, and particularly as taught in the above-mentioned Japanese Laid-Open Patent Application 2003-270533. Using a cemented lens component in the second lens group enables reducing axial chromatic aberration, and using a lens element made of plastic results in lower cost. However, using a lens element made of plastic, the optical characteristics vary much more due to temperature changes than with a lens element made from glass. Thus, making the lens element of plastic tends to increase problems of shifting of focus and fluctuations in the location of the image plane along the optical axis. With a small imaging lens, it has recently become possible to independently and freely control the movement of multiple movable lens groups with a small actuator that uses a piezoelectric element as the movement mechanism. Although the optical characteristics change due to the temperature change, it is comparatively easy to control, for example, the movement of the first lens group 11 and the second lens group 12 so as to compensate for these changes. Therefore, even if a plurality of lens elements are made of plastic, compensation can be made in this manner.

In addition, satisfying Conditions (1) and (2) above particularly results in establishing appropriate power allocation, thereby realizing a compact optical system with shorter overall length. Appropriate adoption of preferable conditions, as described above, results in additional advantages in correcting aberrations and providing appropriate power allocations, and a zoom optical system can be obtained with excellent performance that supports high pixel density. For example, using a lens made from plastic enables achieving lower cost. Using aspheric lenses also enables better aberration correction, and further enables shortening of the overall length of the lens system. In this manner, a compact zoom lens especially suitable for mounting in small information terminal devices can be realized at low cost. Also, as explained above, a cemented lens component is used effectively to support the use of an image pickup element with a high pixel density.

Embodiments 1–3 of the present invention will now be individually described with further reference to the drawings.

Embodiment 1

FIG. 1 shows a cross-sectional view of Embodiment 1 of the zoom lens of the present invention at the wide-angle end. Table 1 below lists, in order from the object side, the lens group number, with numbers 1, 2, and 3 corresponding to the lens groups 11, 12, and 13, respectively, the designations of the lens elements, G1 to G3, the aperture St, the lens elements G4 to G6, and the cover glass GC, respectively. It also lists, in order from the object side, the surface number #, the radius of curvature R (in mm) of each surface on the optical axis, the on-axis surface spacing D (in mm), as well as the refractive index $N_d$ and the Abbe number $v_d$ (both at the d-line of 587.6 nm) of each optical element for Embodiment 1. The numerical values of Table 1 are based on a normalized focal length of 100 mm at the wide-angle end for the d-line (587.6 mm).

TABLE 1

| Lens Group | Lens Element | # | R | D | $N_d$ | $v_d$ |
|---|---|---|---|---|---|---|
| 1 | G1 | 1 | −5892.7 | 13.61 | 1.73 | 37.9 |
| 1 | G1 | 2 | 94.0 | 15.01 | | |
| 1 | G2 | 3 | 105.9 | 27.21 | 1.86 | 23.8 |
| 1 | G2 | 4 | 173.6 | D4 (variable) | | |
| 2 | G3 | 5* | 130.1 | 22.61 | 1.52 | 58.9 |
| 2 | G3 | 6* | −195.0 | 0.00 | | |
| 2 | St (stop) | 7 | ∞ | 5.60 | | |
| 2 | G4 | 8 | 85.0 | 28.01 | 1.84 | 37.1 |
| 2 | G4, G5 | 9 | 560.2 | 15.01 | 1.86 | 23.8 |
| 2 | G5 | 10 | 55.9 | D10 (variable) | | |
| 3 | G6 | 11* | 736.5 | 61.22 | 1.51 | 56.3 (plastic) |
| 3 | G6 | 12* | −110.0 | 10.60 | | |
| | GC | 13 | ∞ | 10.00 | 1.52 | 64.2 |
| | GC | 14 | ∞ | 37.02 | | |

The surfaces with a * to the right of the surface number in Table 1 are aspheric lens surfaces, and the aspheric surface shape is expressed by Equation (A) above. As indicated in Table 1, both surfaces of the third lens element G3 and the sixth lens element G6 are aspheric.

Table 2 below lists the values of the constant K and the aspherical coefficients $A_4$, $A_6$, $A_8$, and $A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0 \times 10^{-2}$.

TABLE 2

| # | K | $A_4$ | $A_6$ | $A_8$ | $A_{10}$ |
|---|---|---|---|---|---|
| 5 | −0.3896 | 7.4542E−8 | −1.8349E−13 | −7.5405E−21 | −2.6398E−28 |
| 6 | 0.3358 | 1.2849E−7 | 1.9240E−13 | 7.0744E−21 | 2.0011E−28 |
| 11 | −0.5598 | 5.4511E−8 | 3.4200E−14 | −2.6211E−21 | −2.8319E−27 |
| 12 | −3.9972 | 1.5110E−8 | 5.5196E−15 | 5.0733E−21 | 1.6223E−27 |

In the zoom lens of Embodiment 1, both the first lens group 11 and the second lens group 12 move during zooming. Therefore, the on-axis spacings D4 and D10 change with zooming. Table 3 below lists the values of the focal length f (in mm) and the variables D4 and D10 (in mm) at the wide-angle end (f=100 mm) and at the telephoto end (f=275 mm) when the zoom lens is focused at infinity.

TABLE 3

| f | D4 | D10 |
|---|---|---|
| 100 mm | 154.66 | 40.82 |
| 275 mm | 11.54 | 194.10 |

The zoom lens of Embodiment 1 of the present invention satisfies Conditions (1), (2), (3), (4), and (5) above as set forth in Table 4 below. Additionally, Embodiment 1 satisfies the following Condition (4A), which is a more preferable further restriction on Condition (4) above:

$0.4 < DG45/fw < 0.7$           Condition (4A).

TABLE 4

| Condition No. | Condition | Value |
|---|---|---|
| (1) | 4.0 < Tt/fw < 5.0 | 4.51 |
| (2) | 1.1 < f2g/fw < 1.45 | 1.40 |
| (3) | 30 < |v3/f3 + v4/f4 + v5/f5| · fw < 50 | 37.90 |
| (4) | 0.4 < DG45/fw < 0.9 | 0.43 |
| (4A) | 0.4 < DG45/fw < 0.7 | 0.43 |
| (5) | 65 < |v3/f3 + v4/f4 + v5/f5 + v6/f6| · fw < 75 | 69.16 |

Figure 3A:
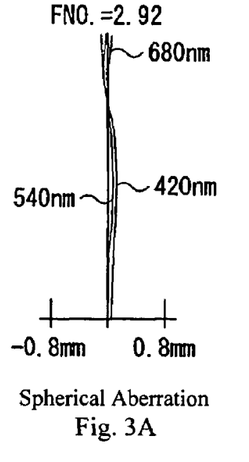
FIGS. 3A–3C show the spherical aberration, astigmatism, and distortion, respectively, of the zoom lens according to Embodiment 1 at the wide-angle end.
Figure 3B:
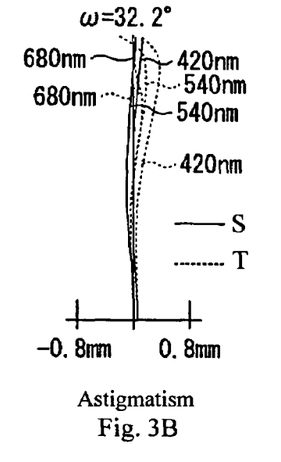
Figure 3C:
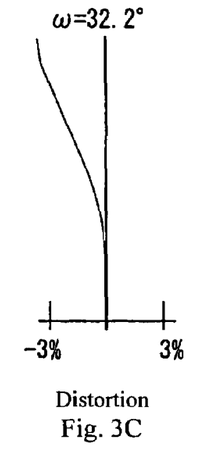
Figure 4A:
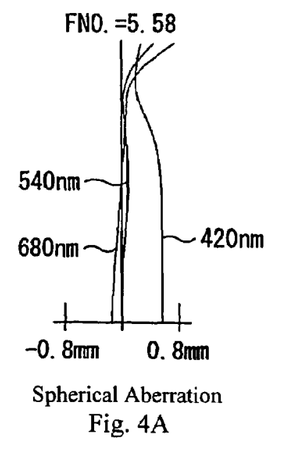
FIGS. 4A–4C show the spherical aberration, astigmatism, and distortion, respectively, of the zoom lens according to Embodiment 1 at the telephoto end.
Figure 4B:
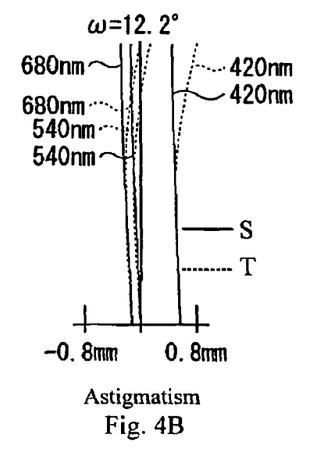
Figure 4C:
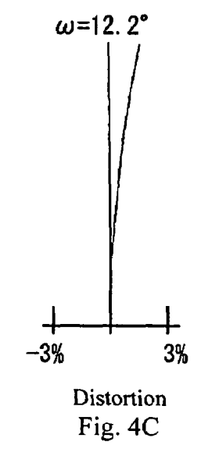

FIGS. 3A–3C show the spherical aberration, astigmatism, and distortion, respectively, of the zoom lens of Embodiment 1 at the wide-angle end. FIGS. 4A–4C show the spherical aberration, astigmatism, and distortion, respectively, of the zoom lens of Embodiment 1 at the telephoto end. In FIGS. 3A and 4A, the spherical aberration is shown for the wavelengths 420 nm, 540 nm, and 680 nm, and the f-number is listed. In FIGS. 3B, 3C, 4B, and 4C, ω is the half-field angle. In FIGS. 3B and 4B, the astigmatism is shown for the sagittal image surface S and the tangential image surface T for the wavelengths 420 nm, 540 nm, and 680 nm. In FIGS. 3C and 4C, distortion is measured at the d-line (587.6 nm).

As is apparent from these figures and the above numerical data, Embodiment 1 of the present invention is a compact and high performance zoom lens with excellent control of aberrations that is useful in small information terminal equipment.

Embodiment 2

FIG. 2 shows a cross-sectional view of Embodiment 2 of the zoom lens of the present invention at the wide-angle end. Embodiment 2 is similar to Embodiment 1 and therefore only the differences between Embodiment 2 and Embodiment 1 will be explained. In Embodiment 2, the aperture stop St is arranged at the object side of the third lens element G3, which reduces the effective aperture of the first lens group 11 in comparison with a case in which it is arranged farther on the image side (as in Embodiment 1), thereby enabling the overall length of the zoom lens to be shortened. As discussed previously, since the fourth lens element in this embodiment is biconcave, the object-side lens surface of the object-side lens element of the fourth lens component in this embodiment concave.

In Embodiment 2, it is preferable that both surfaces of both the first lens element G1 and the third lens element G3 be aspheric. Additionally, it is preferable that at least the first lens element G1 be made of plastic. In Embodiment 2 of Table 5 below, both lens elements G1 and G6 are made of plastic.

With the first lens element G1 having negative refractive power and being made of plastic, it is especially preferable that the sixth lens element G6, which has positive refractive power, also be made of plastic. By having both a lens element having positive refractive power and a lens element having negative refractive power made of plastic, compensation required for movement in focus due to temperature changes can be reduced. Therefore, in Embodiment 2, both lens elements G1 and G6 are made of plastic.

Additionally, it is preferable that the image-side surface, for example, of the third lens element G3 be configured with a curvature having an opposite sign on the periphery from that on the optical axis. In particular, in Embodiment 2, the image-side surface of the third lens element G3 is convex on-axis and becomes concave as it approaches the periphery. This is advantageous in order to correct aberrations.

In Embodiment 2, the fourth lens element G4 has a concave surface on the object side, and in the particular zoom lens of FIG. 2, the fourth lens element G4 is a spherical lens with a biconcave configuration, thus having negative refractive power.

This zoom lens preferably satisfies the following Conditions (1A) and (2A), which further restrict Conditions (1) and (2) above, in order to enable shortening the overall length of the zoom lens:

$$4.0 < Tt/fw < 4.3 \quad \text{Condition (1A)}$$

$$1.1 < f2g/fw < 1.35 \quad \text{Condition (2A).}$$

As explained above, this zoom lens supports a high pixel density with a compact zoom optical system especially suitable for mounting onto a small, low cost information terminal device.

Table 5 below lists, in order from the object side, the lens group number, with numbers 1, 2, and 3 corresponding to lens groups 11, 12, and 13, respectively, the designations of the lens elements, G1 to G2, the aperture St, the lens elements G3 to G6, and the cover glass GC, respectively. It also lists, in order from the object side, the surface number #, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 2. The numerical values of Table 5 are based on a normalized focal length of 100 mm at the wide-angle end for the d-line (587.6 nm).

TABLE 5

| Group | Lens Element | # | R | D | $N_d$ | $v_d$ |
|---|---|---|---|---|---|---|
| 1 | G1 | 1* | −230.6 | 14.86 | 1.51 | 56.3 (plastic) |
| 1 | G1 | 2* | 69.8 | 21.62 | | |
| 1 | G2 | 3 | 105.0 | 31.07 | 1.81 | 39.6 |
| 1 | G2 | 4 | 220.4 | D4 (variable) | | |
| 2 | St (stop) | 5 | ∞ | −7.91 | | |
| 2 | G3 | 6* | 59.6 | 39.37 | 1.57 | 58.6 |
| 2 | G3 | 7* | −122.5 | 3.86 | | |
| 2 | G4 | 8 | −572.8 | 39.57 | 1.86 | 23.8 |
| 2 | G4, G5 | 9 | 94.1 | 19.30 | 1.84 | 37.1 |
| 2 | G5 | 10 | 70.3 | D10 (variable) | | |
| 3 | G6 | 11 | 190.4 | 42.46 | 1.51 | 56.3 (plastic) |
| 3 | G6 | 12 | −260.9 | 19.30 | | |
| | GC | 13 | ∞ | 9.65 | 1.52 | 64.2 |
| | GC | 14 | ∞ | 9.48 | | |

The surfaces with a * to the right of the surface number in Table 5 are aspheric lens surfaces, and the aspheric surface shape is expressed by Equation (A) above. As indicated in Table 5, both surfaces of the first lens element G1 and the third lens element G3 are aspheric.

Table 6 below lists the values of the constant K and the aspherical coefficients $A_3$–$A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E−2" represents the number $1.0 \times 10^{-2}$.

TABLE 6

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | 1.0000 | 6.9378E−7 | 4.8263E−7 | −6.2736E−10 | −9.8347E−11 | 1.3585E−12 | −3.2037E−14 | 4.7130E−16 | −2.0994E−18 |
| 2 | 0.9991 | −5.3754E−7 | 1.8091E−7 | 9.2254E−10 | 1.4300E−10 | −7.3938E−13 | −1.3288E−13 | 1.3059E−15 | 1.8288E−18 |
| 6 | 0.9999 | 0 | −9.6071E−8 | 0 | 3.8198E−10 | 0 | −1.2292E−13 | 0 | 1.3759E−16 |
| 7 | 1.0001 | 0 | 1.4916E−6 | 0 | 6.6350E−10 | 0 | −5.3838E−13 | 0 | 8.3540E−16 |

In the zoom lens of Embodiment 2, both the first lens group 11 and the second lens group 12 move during zooming. Therefore, the on-axis spacings D4 and D10 change with zooming. Table 7 below lists the values of the focal length f (in mm) and the variables D4 and D10 (in mm) at the wide-angle end (f=100 mm) and at the telephoto end (f=275 mm) when the zoom lens is focused at infinity.

TABLE 7

| f | D4 | D10 |
|---|---|---|
| 100 mm | 147.65 | 37.25 |
| 275 mm | 20.18 | 173.59 |

The zoom lens of Embodiment 2 of the present invention satisfies Conditions (1), (2), (2A), (3), (4), and (5) above as set forth in Table 8 below.

TABLE 8

| Condition No. | Condition | Value |
|---|---|---|
| (1) | $4.0 < Tt/fw < 5.0$ | 4.36 |
| (2) | $1.1 < f2g/fw < 1.45$ | 1.23 |
| (2A) | $1.1 < f2g/fw < 1.35$ | 1.23 |
| (3) | $30 < |v3/f3 + v4/f4 + v5/f5| \cdot fw < 50$ | 43.98 |
| (4) | $0.4 < DG45/fw < 0.9$ | 0.83 |
| (5) | $65 < |v3/f3 + v4/f4 + v5/f5 + v6/f6| \cdot fw < 75$ | 70.93 |

Figure 5A:
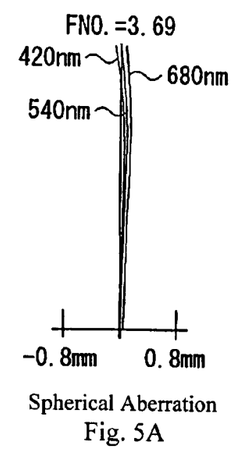
FIGS. 5A–5C show the spherical aberration, astigmatism, and distortion, respectively, of the zoom lens according to Embodiment 2 at the wide-angle end.
Figure 5B:
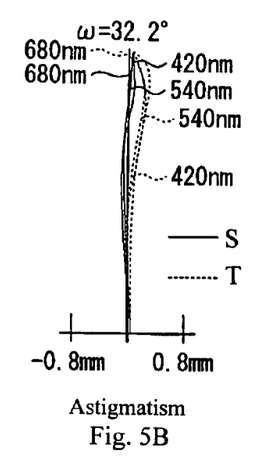
Figure 5C:
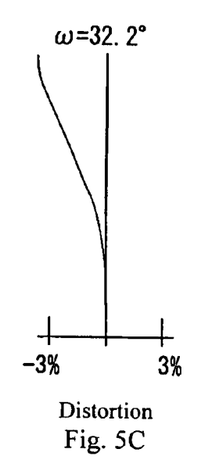
Figure 6A:
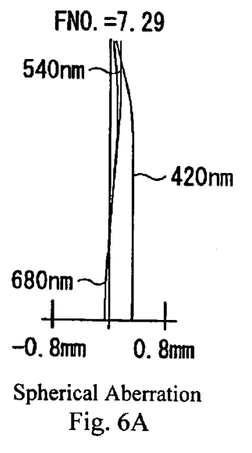
FIGS. 6A–6C show the spherical aberration, astigmatism, and distortion, respectively, of the zoom lens according to Embodiment 2 at the telephoto end.
Figure 6B:
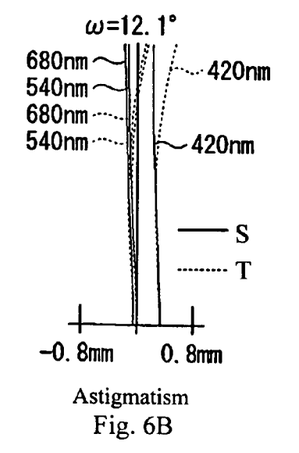
Figure 6C:
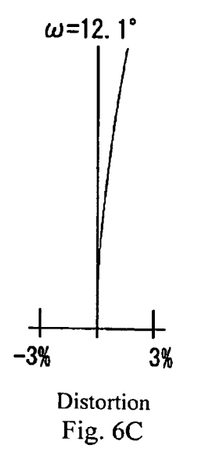

FIGS. 5A–5C show the spherical aberration, astigmatism, and distortion, respectively, of the zoom lens of Embodiment 2 at the wide-angle end. FIGS. 6A–6C show the spherical aberration, astigmatism, and distortion, respectively, of the zoom lens of Embodiment 2 at the telephoto end. In FIGS. 5A and 6A, the spherical aberration is shown for the wavelengths 420 nm, 540 nm, and 680 nm, and the f-number is listed. In FIGS. 5B, 5C, 6B, and 6C, ω is the half-field angle. In FIGS. 5B and 6B, the astigmatism is shown for the sagittal image surface S and the tangential image surface T for the wavelengths 420 nm, 540 nm, and 680 nm. In FIGS. 5C and 6C, distortion is measured at the d-line (587.6 nm).

As is apparent from these figures and the above numerical data, Embodiment 2 of the present invention is a compact and high performance zoom lens with excellent control of aberrations that is useful in small information terminal equipment.

Embodiment 3

Embodiment 3 is very similar to Embodiment 2 and therefore is well shown by FIG. 2, and only the differences will be explained. In Embodiment 3 only the first lens element G1 is made of plastic. Additionally, Embodiment 3 differs from Embodiment 2 in its lens element configuration by having different radii of curvature of the lens surfaces, different aspheric coefficients of the aspheric lens surfaces, some different optical element surface spacings, and some different refractive indexes.

Table 9 below lists, in order from the object side, the lens group number, with numbers 1, 2, and 3 corresponding to lens groups 11, 12, and 13, respectively, the designations of the lens elements, G1 to G2, the aperture St, the lens elements G3 to G6, and the cover glass GC, respectively. It also lists, in order from the object side, the surface number #, the radius of curvature R (in mm) of each surface near the optical axis, the on-axis surface spacing D (in mm), as well as the refractive index $N_d$ and the Abbe number $v_d$ (both at the d-line of 587.6 nm) of each optical element for Embodiment 3. The numerical values of Table 9 are based on a normalized focal length of 100 mm at the wide-angle end for the d-line (587.6 nm).

TABLE 9

| Group | Lens Element | # | R | D | $N_d$ | $v_d$ |
|---|---|---|---|---|---|---|
| 1 | G1 | 1* | −230.3 | 14.84 | 1.51 | 56.3 (plastic) |
| 1 | G1 | 2* | 69.8 | 21.59 | | |
| 1 | G2 | 3 | 104.8 | 31.04 | 1.81 | 39.6 |
| 1 | G2 | 4 | 220.0 | D4 (variable) | | |
| 2 | St (stop) | 5 | ∞ | −7.90 | | |
| 2 | G3 | 6* | 59.5 | 39.32 | 1.57 | 58.6 |
| 2 | G3 | 7* | −122.3 | 3.86 | | |
| 2 | G4 | 8 | −572.2 | 28.92 | 1.86 | 32.4 |
| 2 | G4, G5 | 9 | 1926.3 | 29.88 | 1.86 | 23.8 |
| 2 | G5 | 10 | 70.2 | D10 (variable) | | |
| 3 | G6 | 11 | 189.9 | 42.41 | 1.52 | 52.4 |
| 3 | G6 | 12 | −259.0 | 19.28 | | |
| | GC | 13 | ∞ | 9.64 | 1.52 | 64.2 |
| | GC | 14 | ∞ | 9.65 | | |

The surfaces with a * to the right of the surface number in Table 9 are aspheric lens surfaces, and the aspheric surface shape is expressed by Equation (A) above. As indicated in Table 9, both surfaces of the first lens element G1 and the third lens element G3 are aspheric.

Table 10 below lists the values of the constant K and the aspherical coefficients $A_3$–$A_{10}$ used in Equation (A) above for each of the aspheric lens surfaces of Table 9. Aspheric coefficients that are not present in Table 10 are zero. An "E" in the data indicates that the number following the "E" is the exponent to the base 10. For example, "1.0E−2" represents the number $1.0 \times 10^{-2}$.

TABLE 10

| # | K | $A_3$ | $A_4$ | $A_5$ | $A_6$ | $A_7$ | $A_8$ | $A_9$ | $A_{10}$ |
|---|---|---|---|---|---|---|---|---|---|
| 1 | 1.0000 | 6.9551E−7 | 4.8444E−7 | −6.3050E−10 | −9.8964E−11 | 1.3688E−12 | −3.2318E−14 | 4.7604E−16 | −2.1231E−18 |
| 2 | 1.0000 | −5.3888E−7 | 1.8159E−7 | 9.2717E−10 | 1.4389E−10 | −7.4494E−13 | −1.3405E−13 | 1.3190E−15 | 1.8495E−18 |
| 6 | 1.0000 | 0 | −9.6432E−8 | 0 | 3.8437E−10 | 0 | −1.2400E−13 | 0 | 1.3914E−16 |
| 7 | 1.0000 | 0 | 1.4972E−6 | 0 | 6.6766E−10 | 0 | −5.4311E−13 | 0 | 8.4485E−16 |

In the zoom lens of Embodiment 3, both the first lens group 11 and the second lens group 12 move during zooming. Therefore, the on-axis spacings D4 and D10 change with zooming. Table 11 below lists the values of the focal length f (in mm) and the variables D4 and D10 (in mm) at the wide-angle end (f=100 mm) and at the telephoto end (f=275 mm) when the zoom lens is focused at infinity.

TABLE 11

| f | D4 | D10 |
|---|---|---|
| 100 mm | 147.47 | 37.20 |
| 275 mm | 20.18 | 173.59 |

The zoom lens of Embodiment 3 of the present invention satisfies Conditions (1), (2), (2A), (3), (4), (4A), and (5) above as set forth in Table 12 below.

TABLE 12

| Condition No. | Condition | Value |
|---|---|---|
| (1) | $4.0 < Tt/fw < 5.0$ | 4.36 |
| (2) | $1.1 < f2g/fw < 1.45$ | 1.23 |
| (2A) | $1.1 < f2g/fw < 1.35$ | 1.23 |
| (3) | $30 < |v3/f3 + v4/f4 + v5/f5| \cdot fw < 50$ | 42.98 |
| (4) | $0.4 < DG45/fw < 0.9$ | 0.59 |
| (4A) | $0.4 < DG45/fw < 0.7$ | 0.59 |
| (5) | $65 < |v3/f3 + v4/f4 + v5/f5 + v6/f6| \cdot fw < 75$ | 67.03 |

Figure 7A:
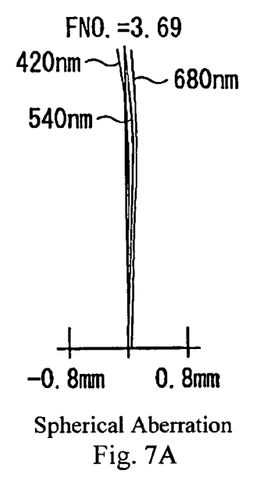
FIGS. 7A–7C show the spherical aberration, astigmatism, and distortion, respectively, of the zoom lens according to Embodiment 3 at the wide-angle end.
Figure 7B:
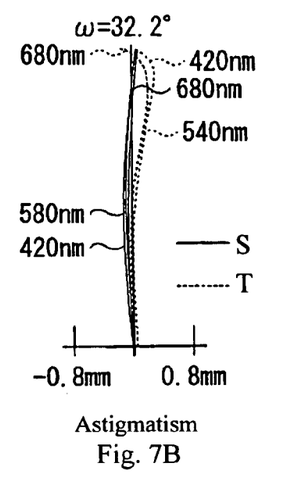
Figure 7C:
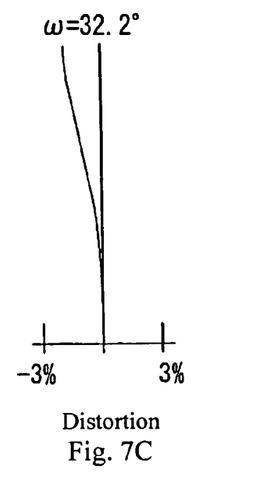
Figure 8A:
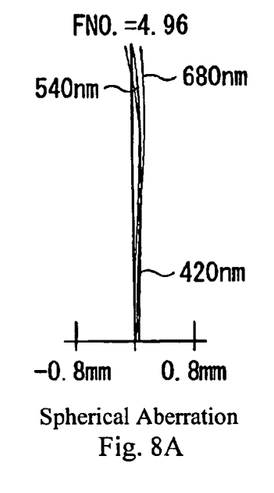
FIGS. 8A–8C show the spherical aberration, astigmatism, and distortion, respectively, of the zoom lens according to Embodiment 3 at the telephoto end.
Figure 8B:
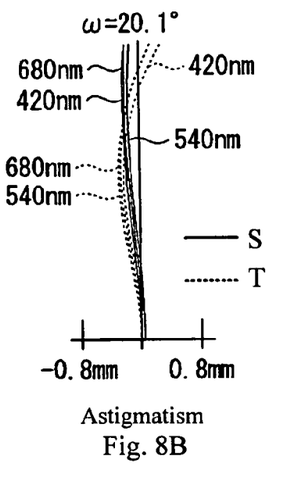
Figure 8C:
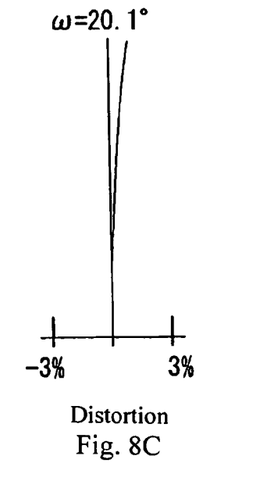

FIGS. 7A–7C show the spherical aberration, astigmatism, and distortion, respectively, of the zoom lens of Embodiment 3 at the wide-angle end. FIGS. 8A–8C show the spherical aberration, astigmatism, and distortion, respectively, of the zoom lens of Embodiment 3 at the telephoto end. In FIGS. 7A and 8A, the spherical aberration is shown for the wavelengths 420 nm, 540 nm, and 680 nm, and the f-number is listed. In FIGS. 7B, 7C, 8B, and 8C, ω is the half-field angle. In FIGS. 7B and 8B, the astigmatism is shown for the sagittal image surface S and the tangential image surface T for the wavelengths 420 nm, 540 nm, and 680 nm. In FIGS. 7C and 8C, distortion is measured at the d-line (587.6 nm).

As is apparent from these figures and the above numerical data, Embodiment 3 of the present invention is a compact and high performance zoom lens with excellent control of aberrations that is useful in small information terminal equipment.

The present invention is not limited to the aforementioned embodiments, as it will be immediately apparent that various alternative implementations are possible. For instance, values such as the radius of curvature R of each of the lens components and lens elements, the shapes of the aspheric lens surfaces, the surface spacings D, the refractive index $N_d$, and Abbe number $v_d$ of the lens elements are not limited to those indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens comprising, arranged along an optical axis in order from the object side:

a first lens group having negative refractive power;
a second lens group having positive refractive power; and
a third lens group having positive refractive power;
wherein
the first lens group and the second lens groups move along the optical axis during zooming;
the first lens group includes, arranged along the optical axis in order from the object side, a first lens component having negative refractive power and a second lens component having positive refractive power;
the second lens group includes, arranged along the optical axis in order from the object side, a third lens component that consists of a lens element made of glass, having a convex surface on the optical axis on the object side, and being aspheric on at least one side, and a fourth lens component that consists of, arranged along the optical axis, a lens element that is cemented on its image side to a lens element that has a concave surface on its image side;
the third lens group consists of a fifth lens component with a convex surface on each side; and
the following conditions are satisfied:

$$4.0 < Tt/fw < 5.0$$

$$1.1 < f2g/fw < 1.45$$

where
Tt is the distance from the most object-side lens surface of the zoom lens to the image plane at the telephoto end when the zoom lens is focused on an object at infinity,
fw is the focal length of the zoom lens at the wide-angle end when the zoom lens is focused on an object at infinity, and
f2g is the focal length of the second lens group.

2. The zoom lens of claim 1, wherein:
said third component consists of a single lens element; and
the following condition is satisfied:

$$30 < |v3/f3 + v4/f4 + v5/f5| \cdot fw < 50$$

where
v3 is the Abbe number at the d-line of said single lens element;
f3 is the focal length of said single lens element;
v4 is the Abbe number at the d-line of the object-side lens element of said fourth lens component,
f4 is the focal length of the object-side lens element of said fourth lens component,
v5 is the Abbe number at the d-line of the image-side lens element of said fourth lens component, and
f5 is the focal length of the image-side lens element of said fourth lens component.

3. The zoom lens of claim 1, wherein the following condition is satisfied:

$$0.4 < DG45/fw < 0.9$$

where
DG45 is the on-axis thickness of said fourth lens component.

4. The zoom lens of claim 2, wherein the following condition is satisfied:

$$0.4 < DG45/fw < 0.9$$

where
DG45 is the on-axis thickness of said fourth lens component.

5. The zoom lens of claim 1, wherein the object-side surface of the object-side lens element of said fourth lens component is concave.

6. The zoom lens of claim 2, wherein the object-side surface of the object-side lens element of said fourth lens component is concave.

7. The zoom lens of claim 3, wherein the object-side surface of the object-side lens element of said fourth lens component is concave.

8. The zoom lens of claim 1, wherein both surfaces of said first lens component are formed by a single lens element made of plastic and having an aspheric surface on each side, and said third lens component has an aspheric surface on each side.

9. The zoom lens of claim 2, wherein both surfaces of said first lens component are formed by a single lens element made of plastic and having an aspheric surface on each side, and said third lens component has an aspheric surface on each side.

10. The zoom lens of claim 3, wherein both surfaces of said first lens component are formed by a single lens element made of plastic and having an aspheric surface on each side, and said third lens component has an aspheric surface on each side.

11. The zoom lens of claim 5, wherein both surfaces of said first lens component are formed by a single lens element made of plastic and having an aspheric surface on each side, and said third lens component has an aspheric surface on each side.

12. The zoom lens of claim 11, wherein said fifth lens component consists of a single lens element made of plastic.

13. The zoom lens of claim 1, wherein the zoom lens includes only five lens components.

14. The zoom lens of claim 13, wherein the zoom lens includes only six lens elements.

15. The zoom lens of claim 2, wherein the zoom lens includes only five lens components.

16. The zoom lens of claim 15, wherein the zoom lens includes only six lens elements.

17. The zoom lens of claim 3, wherein the zoom lens includes only five lens components.

18. The zoom lens of claim 17, wherein the zoom lens includes only six lens elements.

19. The zoom lens of claim 5, wherein the zoom lens includes only six lens elements.

20. The zoom lens of claim 8, wherein the zoom lens includes only six lens elements.

* * * * *